(12) United States Patent
Xie

(10) Patent No.: US 6,540,348 B1
(45) Date of Patent: Apr. 1, 2003

(54) SPECTACLES SET WITH DETACHABLE SHELTER FRAME

(76) Inventor: Yiling Xie, 10699 Hickson St., #23, El Monte, CA (US) 91731

( * ) Notice: Subject to any disclaimer, the term of this patent is extended or adjusted under 35 U.S.C. 154(b) by 0 days.

(21) Appl. No.: 10/116,282

(22) Filed: Apr. 4, 2002

(51) Int. Cl.[7] ................................................. G02C 7/08
(52) U.S. Cl. ............................................ 351/57; 351/47
(58) Field of Search .............................. 351/47, 48, 57, 351/58

(56) References Cited

U.S. PATENT DOCUMENTS 6,382,787 B1 * 5/2002 Xie ............................. 351/47
6,402,318 B1 * 6/2002 Xiao ........................... 351/57

* cited by examiner

Primary Examiner—Huy Mai
(74) Attorney, Agent, or Firm—Raymond Y. Chan; David and Raymond Patent Group

(57) ABSTRACT

A spectacles set includes a primary spectacle frame and a detachable shelter frame adapted for mounting in front of the primary spectacle frame. The detachable shelter frame includes a shelter frame for supporting two auxiliary lenses and a pair of magnetic attaching arrangements connected to the shelter frame. Each of the magnetic attaching arrangements includes a supporting arm extending rearwardly from an inner side of the auxiliary lens of the shelter frame for riding over a primary bridge of the primary spectacle frame so as to securely mount the shelter frame in front of the primary spectacle frame and a magnetic seat which is connected to the supporting arm and extended to magnetically attach the magnetic holder of the primary spectacle frame so as to hold the shelter frame on the primary spectacle frame in position.

20 Claims, 10 Drawing Sheets

SPECTACLES SET WITH DETACHABLE SHELTER FRAME

BACKGROUND OF THE PRESENT INVENTION

1. Field of Invention

The present invention relates to spectacle frame, and more particularly to a spectacles set which comprises a detachable shelter frame adapted for mounting on a primary spectacle frame by means of magnetic attraction.

2. Description of Related Arts

Shelter frames are widely used today. A conventional shelter frame such as clip-on sunglasses, comprises a plurality of clipping for detachably mounted on a shortsighted or farsighted sunglasses so that the we does not need to carry and pay for another pair of shortsighted or farsighted sunglasses. However, the metal made clipping claws may scratch the lenses of the primary eyeglasses during the attaching operation. Also, the wearer requires both hands to align and engage the conventional clip-on sunglasses on the primary eyeglasses correct position. It is troublesome and dangerous for a wearer to use his or her hands to wear such clip-on sunglasses on the regular glasses while he or she is driving.

In order to solve the problem of the above mentioned clip-on sunglasses, magnetic attachment is recently introduced into the eyeglasses industry, such as U.S. Pat. Nos. 5,416,537, 5,568,207, 5,642,177, 5,737,054, and 5,975,691. For example, in U.S. Pat. No. 5,568,207, a primary pair of magnet members is affixed on two side extensions of a primary spectacle frame respectively. A shelter frame, such as a sunglasses, includes a pair of arms for resting over the upper side extensions for preventing the shelter frame from moving downward relative to the primary spectacle for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Moreover, the magnet members are firmly affixed to the spectacle frame of the primary spectacle. Once the spectacle is accidentally bent its shape, the shelter frame may not precisely mounted on the primary spectacle by means of the magnet attachment. Furthermore, the spectacle frame of the primary spectacle must he altered to fit the magnet members thereto such that the magnet members will destroy the aesthetic appearance of the primary spectacle.

SUMMARY OF THE PRESENT INVENTION

A main object of the present invention is to provide a spectacles set which comprises a detachable shelter frame adapted for precisely and easily attaching on a primary spectacle frame by means of a magnetic engaging arrangement SO as to securely mount on the primary spectacle frame without the risk of scratching the lenses of the primary spectacle frame.

Another object of the present invention is to provide a spectacles set, wherein the magnet engaging arrangement is hidden behind the nose supports of the primary spectacle frame so as to keep the aesthetic appearance of the primary spectacle frame.

Another object of the present invention is to provide a spectacles set, wherein the nose supports are adapted to be adjusted their positions with respect to the primary spectacle frame in order to fit the wearer, the wearer may still self-adjust the magnet engaging arrangement to align with the detachable shelter frame even the shape of the primary spectacle frame is slightly distorted.

Another object of the present invention is to provide a spectacles set, wherein two supporting arms of the magnetic attaching arrangement are securely mounted on a primary bridge of the primary spectacle, so as to prevent up and down movement or sideward movement of the detachable shelter frame with respect to the primary spectacle frame.

Another object of the present invention is to provide a spectacles set, wherein the wearer may merely use one hand to attach or detach the detachable shelter frame during exercising or driving.

Another object of the present invention is to provide a spectacles set, which does not require to change the original structural design of the primary spectacle frame.

Another object of the present invention is to provide a spectacles set with detachable shelter frame, wherein no magnet is needed to embed into the primary spectacle frame such that no magnetic field is generated around the primary spectacle frame to affect the wearer's health while he or she normally wears the primary spectacle frame.

Accordingly, in order to accomplish the above objects, the present invention provides a spectacles set comprising a primary spectacle frame and a detachable shelter frame adapted for mounting in front of the primary spectacle frame.

The primary spectacle frame comprises a frame body for mounting a pair of lenses in position, wherein the frame body comprises a primary bridge connected between the two lenses, two nose supports attached at two inner sides of the lenses respectively, two magnetic holders each of which has magnetic attraction ability being provided at the two nose supports respectively, and two side extensions provided at two outer sides of the lenses for coupling a pair of temples respectively.

The detachable shelter frame comprises a shelter frame for supporting two auxiliary lenses and a pair of magnetic attaching arrangements connected to the shelter frame wherein each of the magnetic attaching arrangements comprises a supporting arm extending rearwardly from an inner side of the auxiliary lens of the shelter frame towards the respective magnetic holder for riding on the primary bridge so as to securely mount the shelter frame in front of the primary spectacle frame and a magnetic seat which is connected to the supporting arm and extended to magnetically attach the respective magnetic holder of the primary spectacle frame so as to hold the shelter frame on the primary spectacle frame in position.

DETAILED DESCRIPTION OF THE PREFERRED EMBODIMENT

Figure 1:
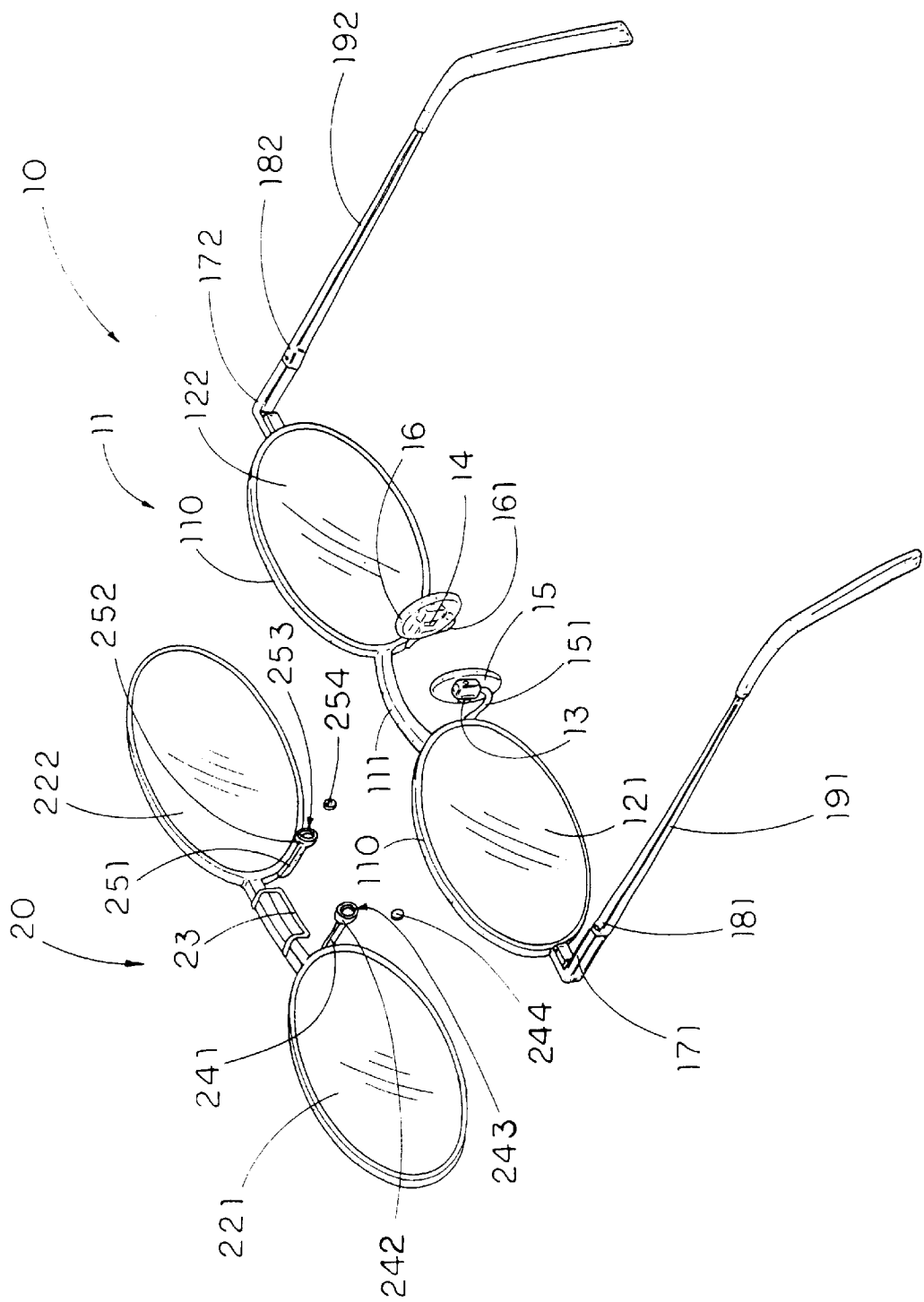
FIG. 1 is a rear perspective views of a spectacles set comprising a primary spectacle frame incorporated with a detachable shelter frame according to a preferred first embodiment of the present invention.

Referring to FIG. 1 of the drawings, a spectacles set according to a preferred embodiment of the present invention is illustrated, wherein the spectacles set comprises a primary spectacle frame 10 and a detachable shelter frame 20 adapted for detachably mounting in front of the primary spectacle frame 10.

The primary spectacle frame 10, such as a conventional spectacle frame, comprises a frame body 11 for mounting a pair of lenses 121, 122 in position. The frame body 11 comprises a primary bridge 111 connected between the two lenses 121, 122 respectively, two nose supports 15, 16 are attached to two inner sides of the lenses 121, 122 respectively, two magnetic holders 13, 14 each having magnetic attraction ability provided at the two nose supports 15, 16 respectively, and two side extensions 171, 172 provided at two outer sides of the lenses 121, 122 respectively wherein each of the two side extensions 171, 172 has a hinge portion 181, 182 extending rearwardly therefrom for pivotally coupling a temple 191, 192.

The frame body 11 of the primary spectacle frame 10 can be constructed as the conventional spectacle frame to have a pair of lens rims 110, as shown in FIG. 1, or the rimless frame that the primary bridge 111 and two side extensions 171, 172 are directly fastened to the edges of the two lenses 121, 122, wherein the two magnetic holders 13, 14 are extended from two ends of the primary bridge 111. In other words, the primary spectacle frame 10 does not require to modify its original structure for mounting the detachable shelter frame 20 thereon.

Figure 2:
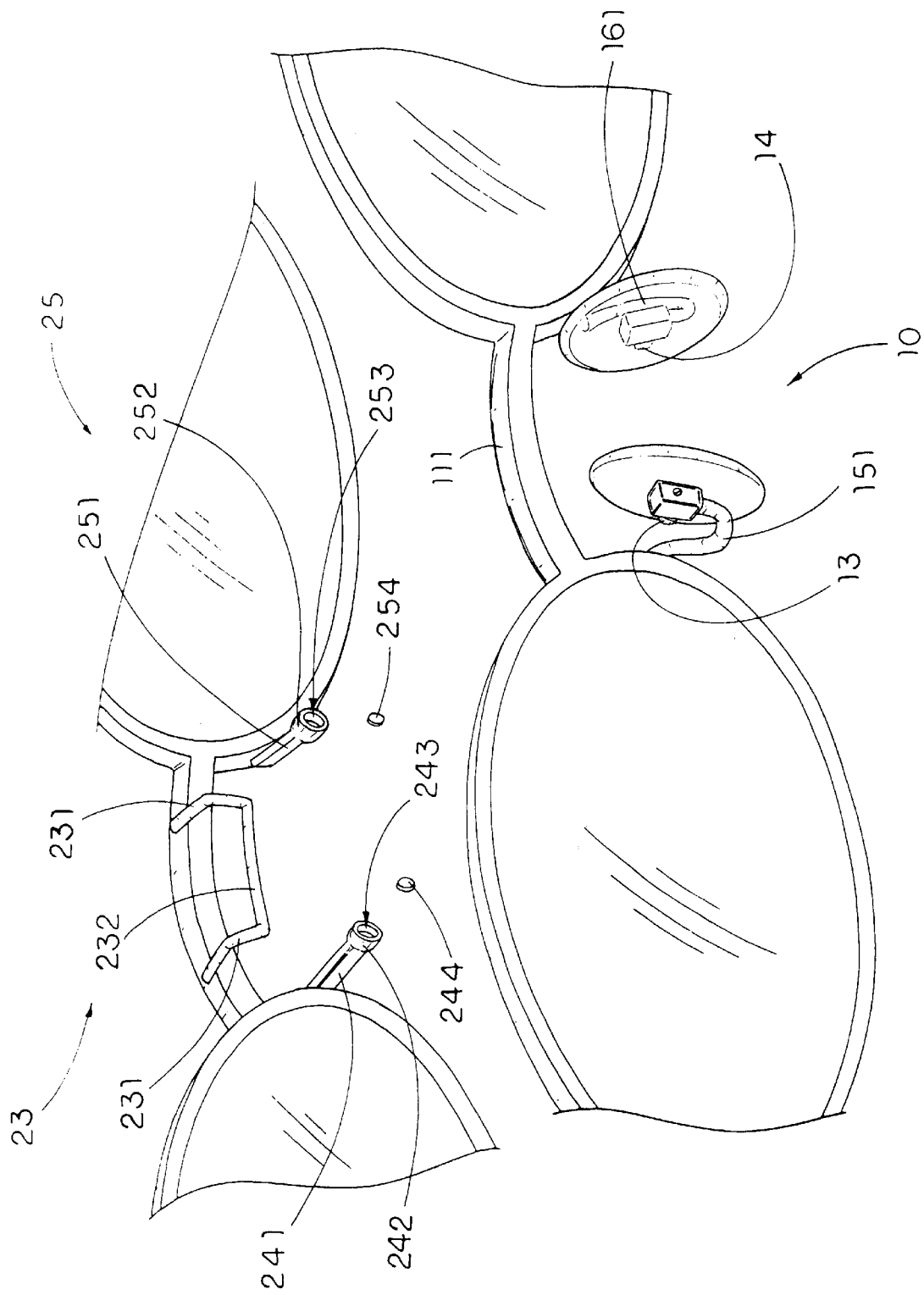
FIG. 2 is a partial enlarged perspective view of a magnetic attaching arrangement of the detachable shelter frame according to the above first preferred embodiment of the present invention.

As shown in FIG. 2, each of the two nose supports 15, 16 has a U-shaped nose supporting arm 151, 161 firmly and rearwardly extended from the frame body 11 therein each of the magnetic holders 13, 14 is provided on top of the nose supporting arm 151, 161. Each of the magnetic holders 13, 14 is made of a kind of metal having magnetic attraction ability such as mild steel, low carbon steel and high grade steel, which is attractive to magnetic material such as permanent magnet. Accordingly, each of the magnetic holders 13, 14 is firmly attached on a top end the respective nose supporting arm 151, 161 at a front side thereof, as shown in FIG. 2, in such a manner that the primary spectacle frame 10 does not require to alter its original structure in order to incorporate with the shelter frame 21 by means of magnetic engagement.

The detachable shelter frame 20 comprises a shelter frame 21 for supporting two auxiliary lenses 221, 222 comprising a clip bridge 23 extended between the two auxiliary lenses 221, 222 for securely engaging with the primary bridge 111 of the primary spectacle frame 10 and a pair of magnetic attaching arrangements 24, 25 connected to the shelter frame 21 for holding the shelter frame 21 in front of the primary spectacle frame 10 in position.

The clip bridge 23 of the shelter frame 21 of the detachable shelter frame 20 is in U-shaped and comprises two rearwardly extending side wires 231 adapted for supporting on two ends of the primary bridge 111 of the frame body 11 and a downwardly curved clipping wire 232 extending behind the primary bridge 111 so that the clip bridge 23 is securely clipped on the primary bridge 111 when the detachable shelter frame 20 is mounted in front of the primary spectacle frame 10.

As shown in FIG. 2, each of the magnetic attaching arrangement 24, 25 comprises a supporting arm 241, 251 extending rearwardly from an inner side of the auxiliary lens 221, 222 of the shelter frame 21 towards the magnetic holder 13, 14 of the primary spectacle frame 10 and a magnetic seat 242, 252 which is connected to the supporting arm 241, 242 and arranged to magnetically attach to the magnetic holder 13, 14 of the primary spectacle frame 10 so as to hold the shelter frame 21 of the sunglasses 20 on the frame body 11 of the primary spectacle frame 10 in position.

Each of the magnetic seats 242, 252 comprises a magnetic housing 243, 253 rearwardly extended from the respective supporting arm 241, 251 wherein each magnetic seat 242, 252 is made of non-magnetic material or soft-magnetic metal having magnetic attraction ability such as mild steel, low carbon steel and high grade steel and a magnet 244, 254 mounted in the magnetic housing 243, 253, which is arranged to face toward and align with the respective magnetic holder 13, 14 of the shelter frame 21 when the detachable shelter frame 20 is mounted in front of the primary spectacle frame 10.

Figure 5:
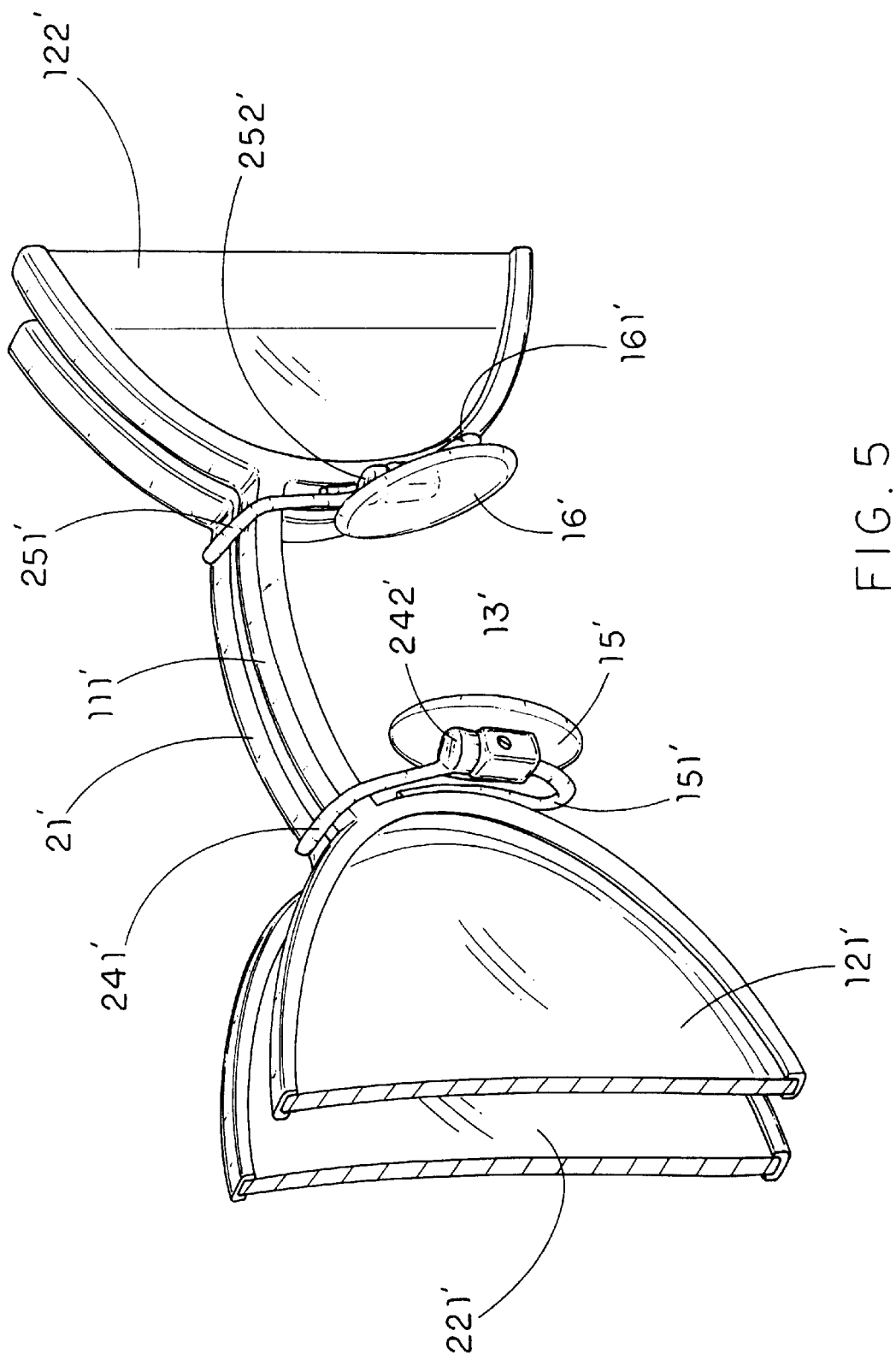
FIG. 5 is a partial rear perspective view of the detachable shelter frame mounted on the primary spectacle frame according to the above second preferred embodiment of the present invention.

As shown in FIG. 5, the two magnetic holders 13, 14 function as two engaging members 132, 142 protruded from the nose supports 15, 16. Each magnet 244, 254 having a thickness is smaller than a depth of the respective magnetic housing 243, 253 so as to define an engaging groove 245, 255 when the magnet 244, 254 is embedded in the magnetic housing 243, 253 for fittedly engaging with the respective engaging member 132, 142. In other words, the two magnetic holders 13, 14 are received in the two engaging grooves 245, 255, so as to further guide the two magnetic attaching arrangement 24, 25 to magnetically attach to the two magnetic holder 13, 14 respectively.

Figure 4:
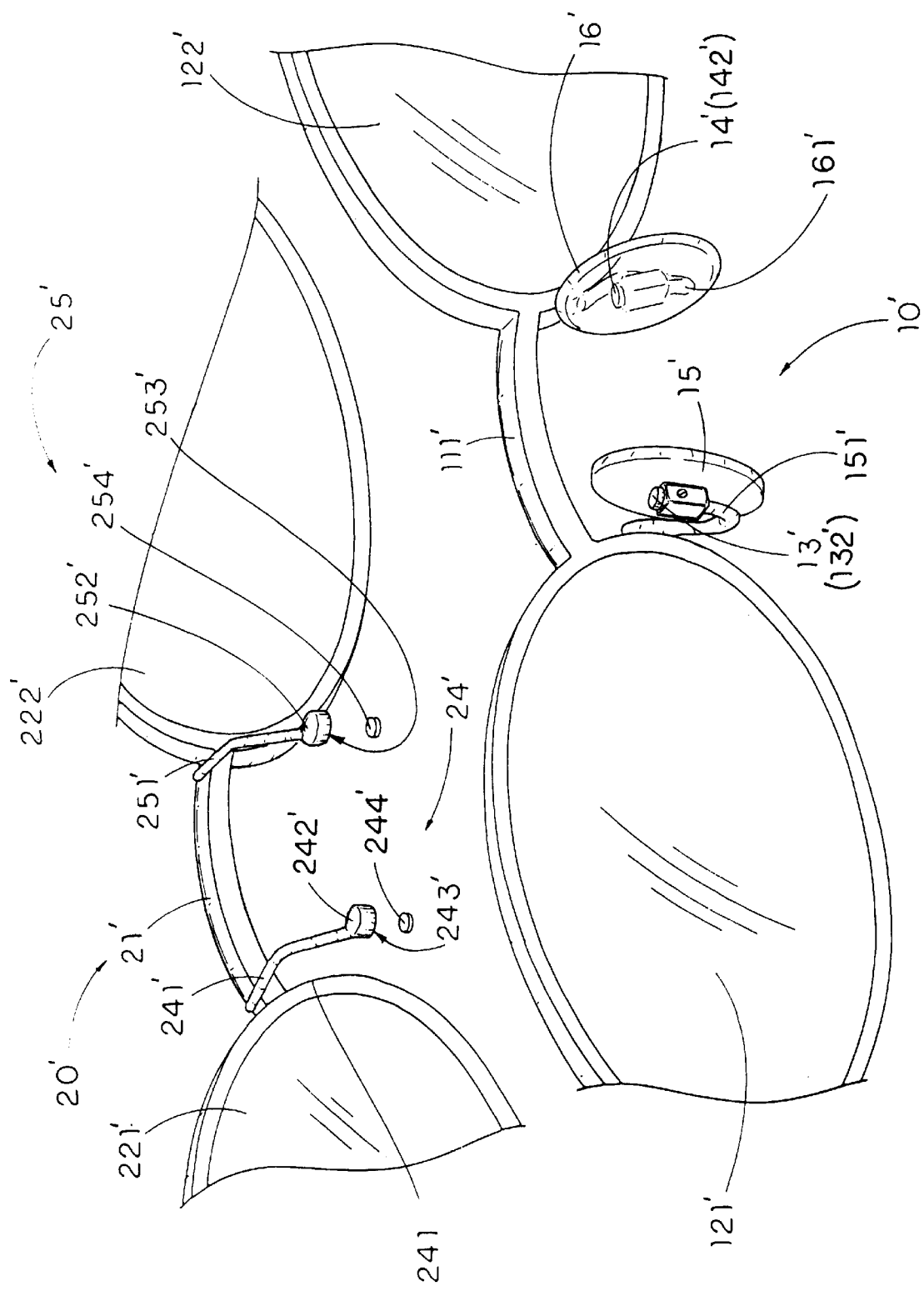
FIG. 4 is a partial enlarged perspective view of a magnetic attaching arrangement of the detachable shelter frame according to a second preferred embodiment of the present invention.

As shown in FIG. 4, a second embodiment of the spectacles set illustrates an alternative mode of the first embodiment, wherein the primary spectacle frame 10 has the same structure except the two magnetic holders 13', 14' are positioned at the top ends the nose supporting arms 151', 161' respectively.

The detachable shelter frame 20' comprises a shelter frame 21' for supporting two auxiliary lenses 221', 222' and a pair of magnetic attaching arrangements 24', 25' connected to the shelter frame 21' wherein each of the magnetic attaching arrangements 24', 25' comprises a supporting arm 241', 251' extending rearwardly from an inner side of the auxiliary lens 221', 222' of the shelter frame 21' for riding on the primary bridge 111 so as to securely mount the shelter frame 21' in front of the primary spectacle frame 10 and a magnetic seat 242', 252' which is connected to the supporting arm 241', 242' and arranged to magnetically attach to the magnetic holder 13', 14' of the primary spectacle frame 10' so as to hold the shelter frame 21' of the detachable shelter frame 20' on the frame body 11' of the primary spectacle frame 10' in position.

Figure 3:
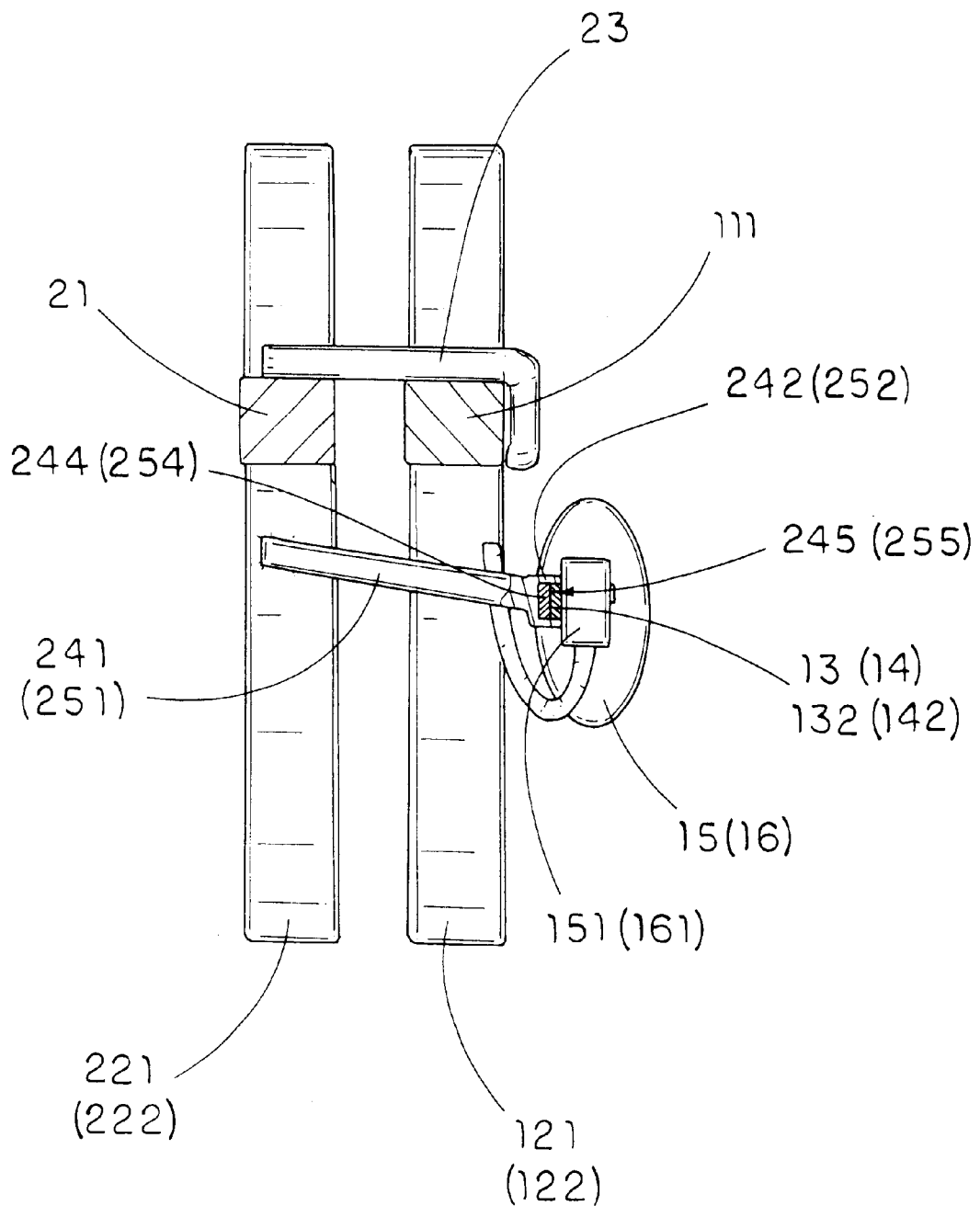
FIG. 3 is a sectional view of the detachable shelter frame mounted in front of the primary spectacle frame according to the above first preferred embodiment of the present invention.

As shown in FIG. 4, each of the supporting arms 241', 251', having a L-shaped, comprises a riding body 2411', 2511' rearwardly extended from the inner side of the respective auxiliary lens 221', 222' to ride on the primary bridge 111' of the frame body 10' and a mounting body 2412', 2512' downwardly and integrally extended from a rear end of the respective riding body 2411', 2511' towards the magnetic holders 13', 14' of the primary spectacle frame 10' respectively. In other words, when the shelter frame 21' is mounted in front of the primary spectacle frame 10', the riding bodies 2411', 2511' of the supporting arms 241', 251' ride over the primary bridge 111 while the clipping bodies 2412', 2512' downwardly extend behind the primary bridge 111' and toward the magnetic holders 13', 14' respectively, so as to mount the detachable shelter frame 20' in front of the primary spectacle frame 10', as shown in FIG. 3.

The magnetic seats 242', 252' are connected to bottom ends of the mounting body 2412', 2512' of the supporting arms 241', 251' respectively to magnetically attach to the magnetic holders 13', 14' of the primary spectacle frame 10'. Accordingly, the two supporting arms 241', 251' function as a bridge clip to ride on top of the primary bridge 111' of the frame body 11' for engaging with the primary bridge 111' so as to securely interlock the shelter frame 21' in front of the primary spectacle frame 10' by preventing any upward, downward, leftward, and rightward movement of the shelter frame 21'.

Each of the magnetic seats 242', 252' comprises a magnetic housing 243', 253' downwardly and suspendedly affixed to a distal end of the respective supporting arm 241', 251' wherein each magnetic seat 242', 252' is made of non-magnetic material or soft magnetic metal having magnetic attraction ability such as mild steel, low carbon steel and high grade steel and a magnet 244', 254' mounted in the magnetic housing 243', 253' which is arranged to face toward and align with the respective magnetic holder 13', 14' of the shelter frame 21' when the shelter frame 21' of the detachable shelter frame 20' is mounted in front of the primary spectacle frame 10'.

Moreover, as shown in FIG. 4, the magnetic holders 13', 14' function as two engaging members 132', 142' upwardly protruded from a top end of the nose supporting arms 151', 161' respectively.

Each magnet 244', 254' has a thickness smaller than a depth of the respective magnetic housing 243', 253' so as to define an engaging groove 245', 255' at a bottom end of the respective magnetic housings 243', 253', so that the magnet 244', 254' is embedded in the magnetic housing 243', 253' for fittedly engaging with the respective engaging member 132', 142'. In other words, the magnetic holders 13', 14' are received in the two engaging grooves 245', 255' respectively to further guide the two magnetic attaching arrangements 24', 25' to magnetically attach to the two magnetic holders 13', 14' respectively.

Figure 6:
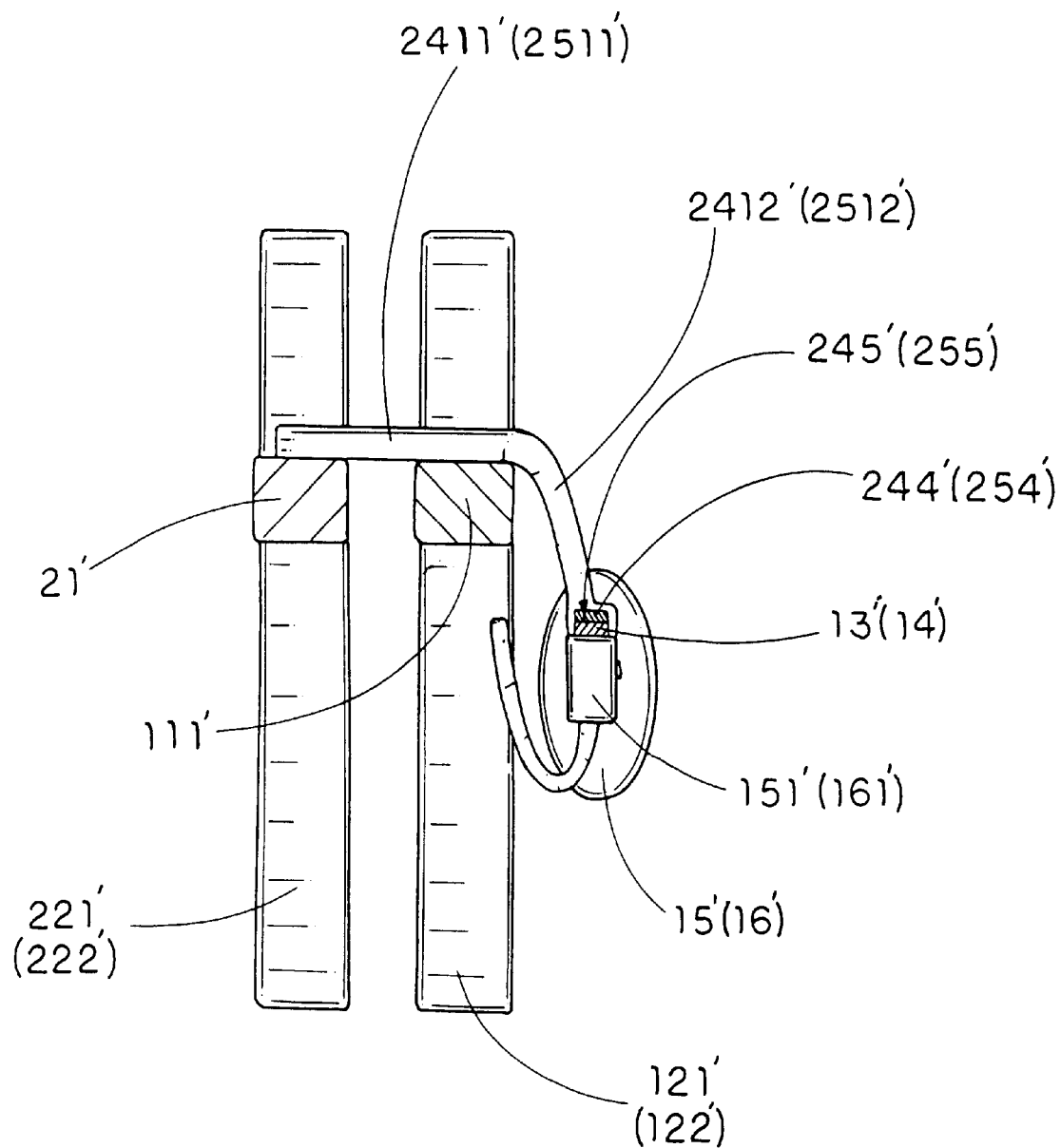
FIG. 6 is a sectional view of the detachable shelter frame mounted on the primary spectacle frame according to the above second preferred embodiment of the present invention.

As shown in FIGS. 5 and 6, when the two supporting arms 241', 251' ride over the primary bridge 111' of the frame body 11', the two magnetic seats 242', 252' will be automatically attracted by the two magnetic holders 131', 14' of the frame body 11' of the primary spectacle frame 10' respectively until the two engaging members 132', 142' are received and engaged in the engaging grooves 245', 255' respectively, so as to precisely guide the shelter frame 21' mounting in front of the primary spectacle frame 10'.

It is worth to mention that the positions of the two nose supports 15', 16' are adapted to be adjusted with respect to the frame body 11' by slightly bending the nose supporting arms 151', 161'. In other words, the two magnetic holders 13', 14' are capable of self-adjusting their positions with respect to the nose supports 15', 16' in order to guide and align the magnetic attachment between the magnetic holders 13'), 14' and the magnetic seats 242', 252' respectively. Accordingly, the wearer is able to adjust the nose supports 15', 16' for not only wearing comfortably but also precisely mounting the shelter frame 21' of the detachable shelter frame 20' in front of the primary spectacle frame 10' without distorting the shape of the frame body 11'. Likewise, the wearer is able to adjust the supporting arms 241', 251' in order to align the magnetic seat 242', 252' with respect to the magnetic holders 13', 14' respectively as well.

In order to mount the shelter frame 21' in front of the primary spectacle frame 10', the user may simply use one hand to put the shelter frame 21' in front of the frame body 11' and drop it down. The supporting arms 241', 251' are securely clipped on the primary bridge 11' so as to securely interlock the shelter frame 21' with the frame body 11'. Moreover, due to the magnetic attraction, the two magnetic seats 242', 252' of the shelter frame 21' are magnetically attracted to the magnetic holders 13', 14', of the frame body 11' respectively, so as to guide the shelter frame 21' to automatically align with the primary spectacle frame 10'. So, the present invention provides not only the magnetic attraction but also the interlocking engagement for securely mounting the shelter frame 21' in front of the primary spectacle frame 10'.

The user can also detach the shelter frame 21' from the frame body 11' of the primary spectacle frame 10' easily by slightly pulling the shelter frame 21' away from the primary spectacle frame 10' until the two magnetic seats 242', 252' move upwardly apart from the two magnetic holders 13', 14', so as to release the magnetic engagement between the shelter frame 21' and the frame body 11'. Then, at the same time, the user may detach the shelter frame 21' by simply lifting it up from the primary spectacle frame 10' with one hand, so as to detach the supporting arms 241', 251' from the primary bridge 111' of the frame body 11'. In other words, the user may merely use one hand to attach or detach the detachable shelter frame 20' from the primary spectacle frame 10' especially when the user is exercising or driving that it is dangerous for him or her to user both hands to wear the detachable shelter frame.

It is worth to mention that since the magnetic holders 13', 14' are attached to the top ends of the nose supporting arms 151', 161', the magnetic holders 13', 14' are hidden behind the nose supports 15', 16' respectively such that when the shelter frame 21' is mounted in front of the primary spectacle frame 10', the magnetic attachment. between the magnetic holders 13', 14' and the magnetic seats 242', 252' will not be seen so as to keep the aesthetic appearance of the primary spectacle frame 10'.

Figure 7:
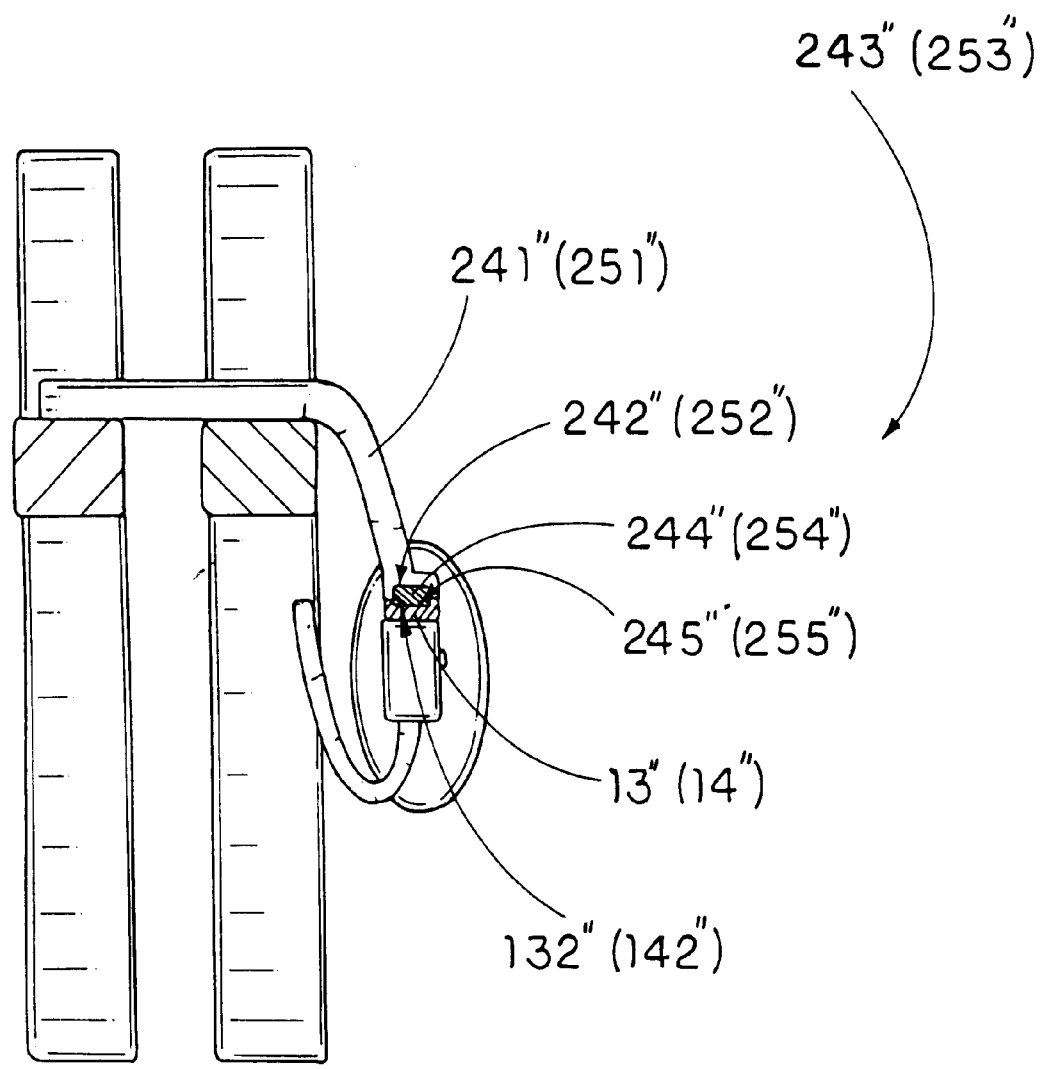
FIG. 7 illustrates a first alternative mode of the magnetic attaching arrangement of the detachable shelter frame according to the above second preferred embodiment of the present invention.

FIG. 7 illustrates a first alternative mode of the magnetic attaching arrangements 24", 25" according to the second embodiment wherein each of the magnetic attaching arrangements 24", 25" comprises a supporting arm 241", 251" extending rearwardly from an inner side of the auxiliary lens 221", 222" of the shelter frame 21" for riding on the primary bridge 111" so as to securely mount the shelter frame 21" in front of the primary spectacle frame 10" and a magnetic seat 242", 252" which is connected to the supporting arm 241", 242" and arranged to magnetically attach to the magnetic holder 13", 14" of the primary spectacle frame 10' so as to hold the shelter frame 21" of the sunglasses 20" on the frame body 11" of the primary spectacle frame 10" in position.

Each of the magnetic seats 242", 252" comprises a magnetic housing 243", 253" downwardly and suspendedly affixed to a distal end of the respective supporting arm 241", 251" wherein each magnetic seat 242", 252" is made of non-magnetic material or soft-magnetic metal having magnetic attraction ability such as mild steel, low carbon steel and high grade steel and a magnet 244", 254" mounted in the magnetic housing 243", 253", which is arranged to face toward and align with the respective magnetic holder 13", 14" of the shelter frame 21" when the shelter frame 21" is mounted in front of the primary spectacle frame 10".

Each magnet 244", 254" has a thickness larger than the depth of the respective magnetic housing 243", 253" so as to define the engaging member 245", 255" at the bottom end of the respective magnetic housing 243", 253", wherein the magnet 244", 254" is embedded in the magnetic housing 243", 253" for fittedly engaging the respective engaging groove 132", 142" indented on the top end of the magnetic holder 13", 14". Therefore, when the shelter frame 21" is mounted in front of the primary spectacle frame 10", the supporting arms 241", 251" ride on the primary bridge 11" of the frame body 11". The two magnetic seats 242", 252" will be automatically attracted by the two magnetic holders 13", 14" of the frame body 11" of the primary spectacle frame 10" respectively until the two engaging members 245", 255" are received in the engaging grooves 132", 142" respectively, so as to precisely guide the shelter frame 21" mounting in front of the primary spectacle frame 10', as shown in FIG. 5.

Figure 8:
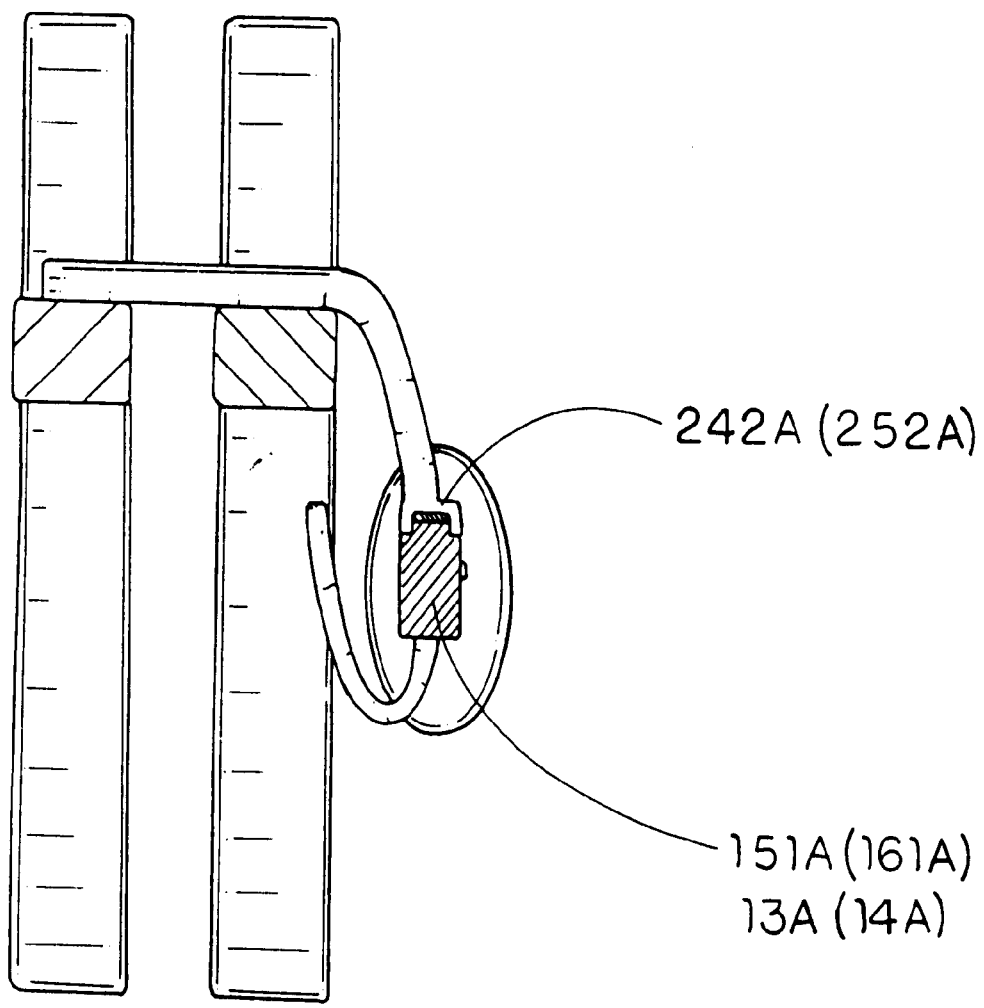
FIG. 8 illustrates a second alternative mode of the magnetic attaching arrangement of the detachable shelter frame according to the above second preferred embodiment of the present invention.

FIG. 8 illustrates a second alternative mode of the magnetic attaching arrangements 24A, 25A, wherein the magnetic holders 13A, 14A are integrally extended from the nose supports 15A, 16A respectively. Accordingly, the magnetic holders 13A, 14A are integrally extended on top of the nose supporting arms 151A, 161A respectively, wherein the nose supporting arms 151A, 161A are made of a kind of metal having magnetic attraction ability such as mild steel, low carbon steel and high grade steel, which is attractive to magnetic material, in such a manner that the magnetic seats 242A, 252A are adapted to magnetically attach to the nose supporting arms 151A, 161A of the nose supports 15A, 16A respectively for holding the shelter frame 21A in front of the primary spectacle frame 10A in position.

It is worth to mention that each of the magnetic holders 13A, 14A is adapted to have the engaging member 132', 142' as mentioned in the second preferred embodiment or to form the engaging groove 132", 142" as mentioned in the first alternative in order to fittedly engage with the magnetic seat 242A, 252A having the engaging groove 245', 255' or the engaging member 245", 255" respectively.

Figure 9:
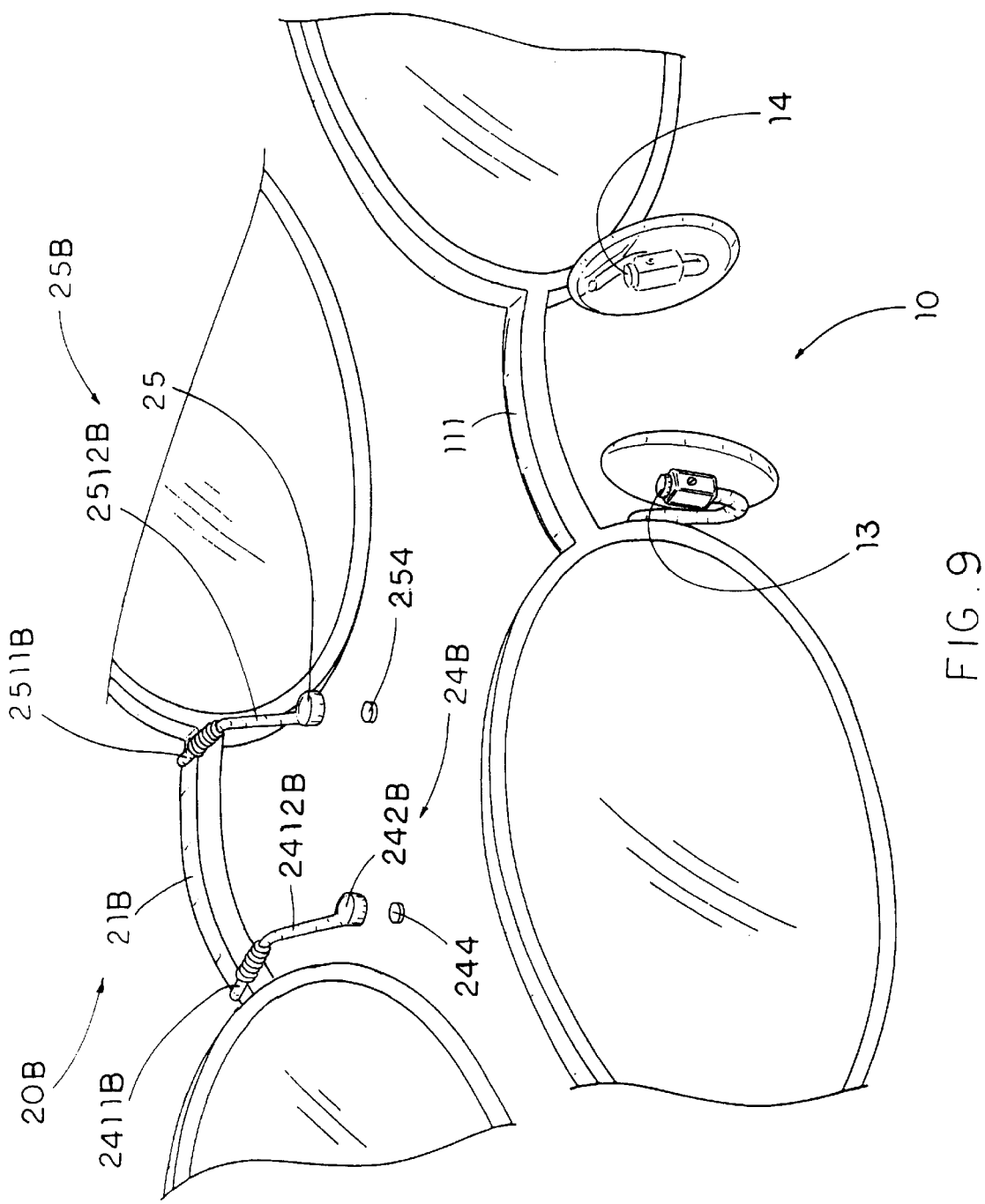
FIG. 9 illustrates an alternative mode of a supporting arm of the magnetic attaching arrangement of the detachable shelter frame according to the above second preferred embodiment of the present invention.

FIG. 9 illustrates an alternative mode of the supporting arm 241B, 251B wherein each of the supporting arms 241B, 251B, having a L-shaped, comprises a riding body 2411B, 2511B rearwardly extended from the inner side of the respective auxiliary lens 221B, 222B to ride on the primary bridge 111 of the frame body 10 and a mounting body 2412B, 2512B downwardly extended from a rear end of the respective riding body 2411B, 2511B towards the magnetic holders 13, 14 of the primary spectacle frame 10 respectively.

As shown in FIG. 9, each of the riding bodies 241B, 251B comprises a resilient element, which is a compression spring according to the preferred embodiment, rearwardly extended from the inner side of the auxiliary lens 221B, 222B for riding on the primary bridge 111' of primary spectacle frame 10'. Accordingly, each resilient element of the riding bodies 2411B, 2511B is securely attached to the inner side of the shelter frame 21B wherein the respective mounting body 2412B, 2512B downwardly extended from a rear end of the respective riding body 2411B, 2511B to connect the respective magnetic seat 242B, 252B. In other words, the resilient element of the riding body 2411B, 2511B is extended from the inner side of the respective auxiliary lens 221B, 222B to the respective mounting body 2412B, 2512B to apply an urging pressure against the primary spectacle frame 10' for holding the frame body 11' of the primary spectacle frame 10' between the shelter frame 21B and the mounting body 2412B, 2512B.

When the shelter frame 21B is mounted in front of the primary spectacle frame 10', the riding bodies 2411B, 2511B of the supporting arms 241B, 251B are ride on the primary bridge 111' while the clipping, bodies 2412B, 2512B are downwardly extended behind the primary bridge 111' towards the magnetic holders 13', 14' respectively, so as to securely mount the detachable shelter frame 20B in front of the primary spectacle frame 10'. Due to the elastic ability of the riding bodies 2411B, 2511B, the supporting arms 241B, 251B will substantially pull the shelter frame 21B towards the primary spectacle frame 10' so as to minimize a gap between the detachable shelter frame 20B and the primary spectacle frame 10'. Moreover, the clipping bodies 2412B, 2512B are adapted to be self-adjusted to magnetically attach to the magnetic holders 13', 14' respectively so as to precisely align the detachable shelter frame 20B with the primary spectacle frame 10. Likewise, the wearer is able to adjust the riding bodies 2411B, 2511B in order to adjust the positions of the mounting body 2412B, 2512B for magnetically attaching to the magnetic holders 13'14' respectively as well.

Figure 10:
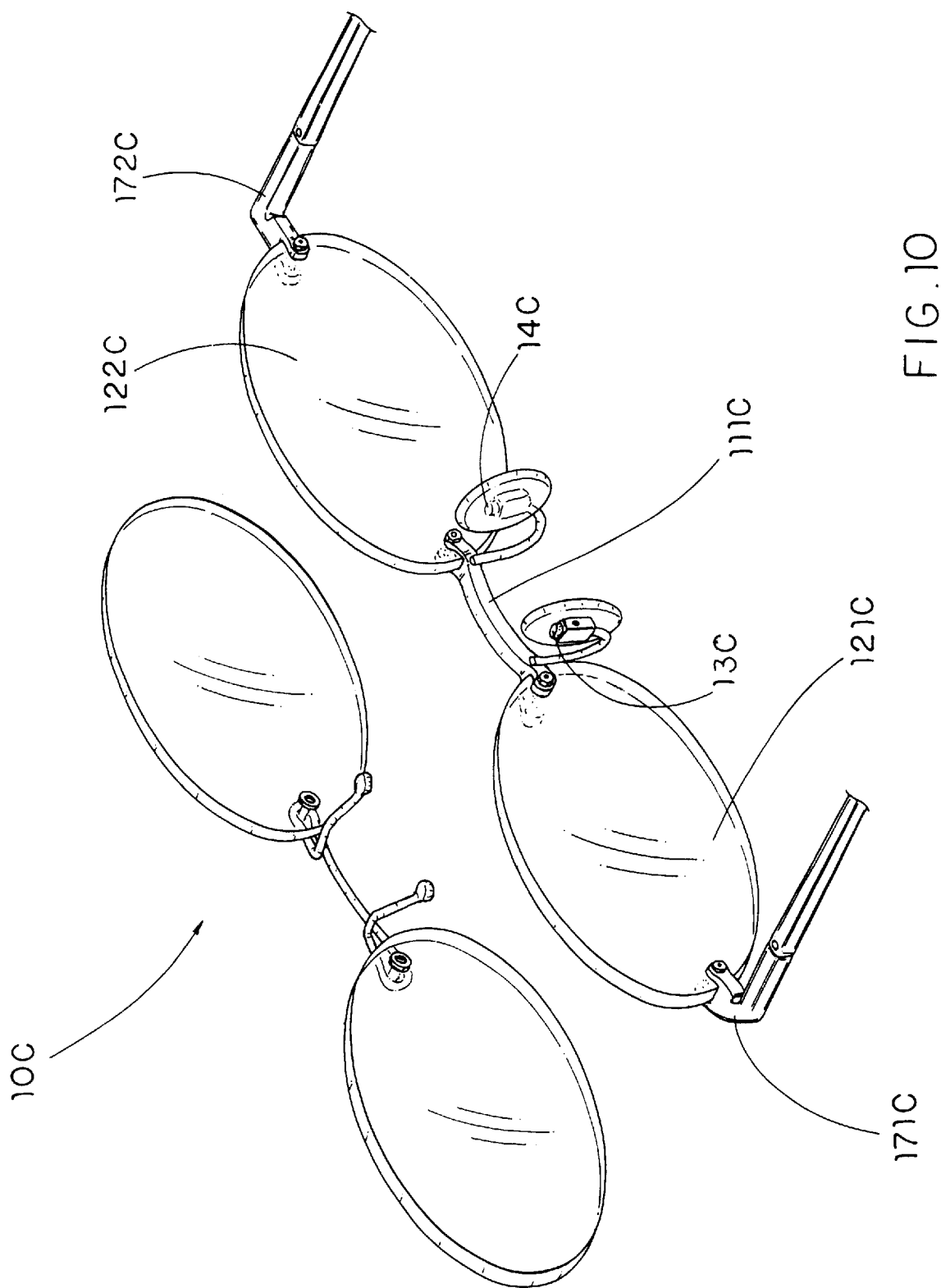
FIG. 10 illustrates an alternative mode of the primary spectacle frame according to the above second preferred embodiment of the present invention.

FIG. 10 illustrates an alternative mode of the primary spectacle frame 10C, wherein the attraction and engagement concept and structure of the second embodiment is same as the above embodiment. The detachable shelter frame 20C in the above embodiment and its alternative modes can also be used for mounting in front of the rimless primary spectacle frame 10C, wherein the two side extensions 171C, 172C and the primary bridge 11C are directly fastened to the edges of the two lenses 121C, 122C.

According to the second embodiment, the primary bridge 111C is connected between the two lenses 121C, 122C by means of two nuts for fastening two ends of the primary bridge 111C at two edges of the lenses 121C, 122C respectively. The two magnetic holder 13C, 14C are downwardly extended from the primary bridge 111C wherein the two magnetic holders 13C, 14C are firmly affixed to the top ends of the two nose supports 15C, 16C respectively. Each of the magnetic holders 13C, 14C is made of soft-magnetic metal having magnetic attraction ability such as mild steel, low carbon steel, and high grade steel, which is attractive to magnetic material such as permanent magnet. So, the detachable shelter frame 20C of the embodiment is also adapted for mounting on the primary spectacle frame 10C of the second embodiment as the same method as it is mentioned above.

Since the primary spectacle frame according to the embodiment and its alternatives do not employed with any magnet, no magnetic field is produced around the primary spectacle frame so that the user is able to wear the primary spectacle frame as usually without affecting by the magnetic field. Thus, both the interlocking engagement and the magnetic attraction are provided by the present invention in order to securely mount the detachable shelter frame in front of the primary spectacle frame.

While the foregoing description and diagram describe the preferred embodiment and its alternatives, it should be appreciated that certain obvious modifications, variations, and substitutions may be made without departing from the spirit and scope of the present invention, such as the shape and size of the magnetic seat and the magnetic holder. Moreover, the magnets can be provided at the magnetic holders respectively while the magnetic seats are made of non-magnetic material or soft-magnetic metal having magnetic attraction ability so as to enhance the magnetic engagement between the shelter frame and the primary spectacle frame.

What is claimed is:

1. A spectacles set, comprising a primary spectacle frame and a detachable shelter frame constructed for mounting in front of said primary spectacle:

said primary spectacle frame comprising a frame body for mounting a pair of lenses in position, wherein said frame body comprises a primary bridge connected between said two lenses, two nose supports attached at two inner sides of said lenses respectively, two magnetic holders, each of which has a magnetic attraction ability, are provided at said two nose supports respectively, and two side extensions provided at two outer sides of said lenses for coupling a pair of temples respectively;

said detachable shelter frame comprising a shelter frame for supporting two auxiliary lenses and a pair of magnetic attaching arrangements connected to said shelter frame wherein each of said magnetic attaching arrangements comprises a supporting arm extending rearwardly from an inner side of the auxiliary lens of said shelter frame towards the respective magnetic holder so as to securely mount said shelter frame in front of said primary spectacle frame and a magnetic seat which is connected to said supporting arm and extended to magnetically attach said respective magnetic holder of said primary spectacle frame so as to hold said shelter frame on said primary spectacle frame in position.

2. The spectacles set, as recited in claim 1, wherein each of said two nose supports has a nose supporting arm rearwardly extended from said frame body, wherein each of said magnetic holders is frontwardly extended from a front side of said respective nose supporting arm to magnetically attach with said respective magnetic seat.

3. The spectacles set, as recited in claim 2, wherein each of said magnetic seat comprises a magnetic housing rearwardly extended from said respective supporting arm and a magnet mounted in said magnetic housing, wherein each said magnetic seat is made of non-magnetic material and is arranged to face toward and align with said respective magnetic holder of said shelter frame when said detachable shelter frame is mounted in front of said primary spectacle frame.

4. The spectacles set, as recited in claim 3, wherein said detachable shelter frame further comprises a clip bridge extended between said two auxiliary lenses to securely engage with said primary bridge of said primary spectacle frame.

5. The spectacles set, as recited in claim 1, wherein each of said magnetic seat comprises a magnetic housing rearwardly extended from said respective supporting arm and a magnet mounted in said magnetic housing, wherein each said magnetic seat is made of non-magnetic material and is arranged to face toward and align with said respective magnetic holder of said shelter frame when said detachable shelter frame is mounted in front of said primary spectacle frame.

6. The spectacles set, as recited in claim 5, wherein said detachable shelter frame further comprises a clip bridge extended between said two auxiliary lenses to securely engage with said primary bridge of said primary spectacle frame.

7. The spectacles set, as recited in claim 1, wherein said each of said magnetic seats comprises a magnetic housing downwardly and suspendedly affixed to a distal end of said respective supporting arm and a magnet mounted in said magnetic housing wherein each said magnetic seat is made of non-magnetic material and is arranged to face toward and align with said respective magnetic holder of said shelter frame when said shelter frame of said detachable shelter frame is mounted in front of said primary spectacle frame.

8. The spectacles set, as recited in claim 7, wherein each of said supporting arms, having a L-shaped, comprises a riding body rearwardly extended from said inner side of said respective auxiliary lens to ride over said primary bridge of said frame body and a mounting body downwardly extended from said respective riding body towards the magnetic holders of said primary spectacle frame respectively when said shelter frame is mounted in front of said primary spectacle frame.

9. The spectacles set, as recited in claim 8, wherein each of said two nose supports has a nose supporting arm rearwardly extended from said frame body, wherein each of said magnetic holders is positioned at a top end of said respective nose supporting arm to magnetically attach with said respective magnetic seat.

10. The spectacles set, as recited in claim 9, wherein each said mounting body of said supporting arms comprises a resilient element extended from said inner side of said respective auxiliary lens to said respective mounting body to apply an urging pressure against said primary spectacle frame for holding said frame body of said primary spectacle frame between said shelter frame and said mounting body.

11. The spectacles set, as recited in claim 9, wherein each of said magnets has a thickness smaller than a depth of said respective magnetic housing so as to define an engaging groove therein when said magnet is embedded in said magnetic housing in such a manner that each said magnetic holder is arranged to received in said respective engaging groove when said magnetic seat is magnetically attached said respective magnetic holder.

12. The spectacles set, as recited in claim 9, wherein each of said magnets has a thickness larger than a depth of said respective magnetic housing so as to define an engaging member protruded therefrom when said magnet is embedded in said magnetic housing to fittedly engage with an engaging groove indented on said respective magnetic holder.

13. The spectacles set, as recited in claim 8, wherein each said mounting body of said supporting arms comprises a resilient element extended from said inner side of said respective auxiliary lens to said respective mounting body to apply an urging pressure against said primary spectacle frame for holding said frame body of said primary spectacle frame between said shelter frame and said mounting body.

14. The spectacles set, as recited in claim 13, wherein each of said magnets has a thickness smaller than a depth of said respective magnetic housing so as to define an engaging, groove therein when said magnet is embedded in said magnetic housing in such a manner that each said magnetic holder is arranged to received in said respective engaging groove when said magnetic seat is magnetically attached said respective magnetic holder.

15. The spectacles set, as recited in claim 13, wherein each of said magnets has a thickness larger than a depth of said respective magnetic housing so as to define an engaging member protruded therefrom when said magnet is embedded in said magnetic housing to fittedly engage with an engaging groove indented on said respective magnetic holder.

16. The spectacles set, as recited in claim 8, wherein each of said magnets has a thickness smaller than a depth of said respective magnetic housing so as to define all engaging groove therein when said magnet is embedded in said magnetic housing in such a manner that each said magnetic holder is arranged to received in said respective engaging groove when said magnetic seat is magnetically attached said respective magnetic holder.

17. The spectacles set, as recited in claim 8, wherein each of said magnets has a thickness larger than a depth of said respective magnetic housing so as to define an engaging member protruded therefrom when said magnet is embedded in said magnetic housing to fittedly engage with an engaging groove indented on said respective magnetic holder.

18. The spectacles set, as recited in claim 1, wherein each of said supporting arms, having a L-shaped, comprises a riding body rearwardly extended from said inner side of said respective auxiliary lens to ride over said primary bridge of said frame body and a mounting body downwardly extended from said respective riding body towards said magnetic holders of said primary spectacle frame respectively when said shelter frame is mounted in front of said primary spectacle frame.

19. The spectacles set, as recited in claim 18, wherein each of said two nose supports has a nose supporting arm rearwardly extended from said frame body, wherein each of said magnetic holders is positioned at a top end of said respective nose supporting arm to magnetically attach with said respective magnetic seat.

20. The spectacles set, as recited in claim 18, wherein each said mounting body of said supporting arms comprises a resilient element extended from said inner side of said respective auxiliary lens to said respective mounting body to apply an urging pressure against said primary spectacle frame for holding said frame body of said primary spectacle frame between said shelter frame and said mounting body.

* * * * *